United States Patent [19]
Billings

[11] Patent Number: 4,550,350
[45] Date of Patent: Oct. 29, 1985

[54] SECURE COPY METHOD AND DEVICE FOR STORED PROGRAMS

[75] Inventor: Raymond J. Billings, Aurora, Colo.

[73] Assignee: Software Distribution Newtork, Inc., Aurora, Colo.

[21] Appl. No.: 515,128

[22] Filed: Jul. 19, 1983

[51] Int. Cl.$^4$ .......................... G11B 5/86; G11B 15/04
[52] U.S. Cl. ........................................ 360/15; 360/60; 360/53
[58] Field of Search ................. 178/22.08; 360/15, 60, 360/13, 53

[56] References Cited

U.S. PATENT DOCUMENTS

| | | | |
|---|---|---|---|
| 3,169,773 | 2/1965 | Redlich et al. | 360/13 |
| 3,243,782 | 3/1966 | Underwood | 360/13 |
| 3,798,359 | 3/1974 | Feistel | 364/200 X |
| 3,958,081 | 5/1976 | Ehrsam et al. | 364/200 X |
| 4,038,645 | 7/1977 | Birney et al. | 364/200 |
| 4,060,839 | 11/1977 | Meadows | 360/135 |
| 4,120,030 | 10/1978 | Johnstone | 364/200 |
| 4,271,482 | 6/1981 | Giraud | 364/900 |
| 4,351,007 | 9/1982 | Youngquist | 360/13 |

FOREIGN PATENT DOCUMENTS

| | | |
|---|---|---|
| 0008033 | 2/1980 | European Pat. Off. . |
| 0105241 | 11/1984 | Japan . |
| 1393920 | 5/1975 | United Kingdom . |
| 1539356 | 1/1979 | United Kingdom . |
| 2122777 | 1/1984 | United Kingdom . |

OTHER PUBLICATIONS

Griffiths, Bloom; Flexible Digital Sound Editing Program for Minicomputer Systems, 3/82, Audio Eng. Soc., vol. 30, No. 3, pp. 127–134.

Primary Examiner—Raymond F. Cardillo, Jr.
Assistant Examiner—A. H. Bowler
Attorney, Agent, or Firm—Yuter, Rosen & Dainow

[57] ABSTRACT

A method and device for reproducing coded programs in which an incomplete program is recorded on one medium and a program having an algorithm for completing the program on the first medium is provided on a second medium. Upon correction of the first program by the algorithm of the second program to record on a third medium, data corresponding to the number of times of operation of the program on the second medium is updated on the second and/or the first medium, to enable accounting of the number of times the program on the first medium has been reproduced.

19 Claims, 3 Drawing Figures

SECURE COPY METHOD AND DEVICE FOR STORED PROGRAMS

This invention is directed to a method for copying data, such as coded programs stored on a master magnetic media, onto a copy magnetic media, while assuring that unauthorized copies cannot be effected, so as to enable the owner of the program to receive an accounting of all copying.

While the invention will be specifically disclosed with reference to programs stored on floppy disk, it will be apparent that the invention is also applicable to other mass storage techniques for storing programs for processing equipment.

A major problem currently exists in the unauthorized copying, for example, of microcomputer programs. Such unauthorized copying reduces the revenues received by the producers of the programs, and thereby discourages the development of programming art. While various techniques have been suggested to prevent piracy, the results have not been totally satisfactory. Thus, among other reasons, it has not been found feasible to provide means for ensuring that a program will be operative only on one individual device.

Further problems exist in the expense involved in the distribution of software. The number of programs available today is very large, and the number is continuously increasing, both as a result of new concepts in programming as well as the increase in hardware that is not mutually compatible.

As a consequence, retail dealers of software are not generally able to carry a wide range of programs for more than a minimum number of hardware types.

It is therefore the object of this invention to provide a method for overcoming the above security and distribution problems, as well as to provide a device enabling the solution of these problems.

As a first component, the present invention provides a master disk, termed a master disk, upon which is coded a program designed for a specific type of computer. The design of a program specific to a particular type of equipment is of course generally necessary today, in view of the incompatibility of the various available data processing devices, such as microcomputers. In accordance with the invention, however, the program on the master disk is designed to be inoperable per se. Thus, the direct use of the master disk in the specified microcomputer will not enable running the program. While the master disk may be copied in a conventional manner by a conventional copy program, to produce an exact duplicate thereof, it is evident that a copy of the master disk produced in this manner will also not be capable of running the intended program.

The program on the master disk may be made inoperable, in itself, by one or more of several techniques. In each case, however, the inoperability may be overcome by processing all or part of the program on the master disk with a given algorithm. For example, the references in the master program to specific memory locations in the computer, for performing various functions, may differ from the correct locations in such microcomputers by a given algorithm, or program lines may be jumbled in a manner that may be correctable by processing with a given algorithm. Of course these techniques are only examples, and it will be apparent that other modification techniques may be employed.

Further, in accordance with the invention, a reproduction program disk is also provided, having thereon a program for modifying the program of the master disk in accordance with the selected algorithm.

The reproduction program may modify the program of the master disk by any one or more of a number of different techniques. For example, the reproduction program may complete missing parts of the master program, may delete excessive parts of the master program, or may arrange or vary parts of the master program in accordance with the algorithm. The master program thus modified by the copy program may be then recorded on a copy disk, to obtain a completely operable reproduced program. In addition to correcting the master copy, the reproduction program also maintains a record of the number of times the master disk has been reproduced. For this purpose, the reproduction program may update data at a determined location in the reproduction program disk, and/or it may modify data at a determined location in the master program disk. Such modification may, for example, be by incrementing, or by any other suitable algorithm.

The invention thereby minimizes the inventory that must be maintained by a retailer of software, while, at the same time, ensures that an accounting may be made of all reproduction, so that the owner of the program may be fairly reimbursed.

In order that the invention will be more clearly understood it will now be disclosed in greater detail in the accompanying drawings, wherein.

Figure 1:
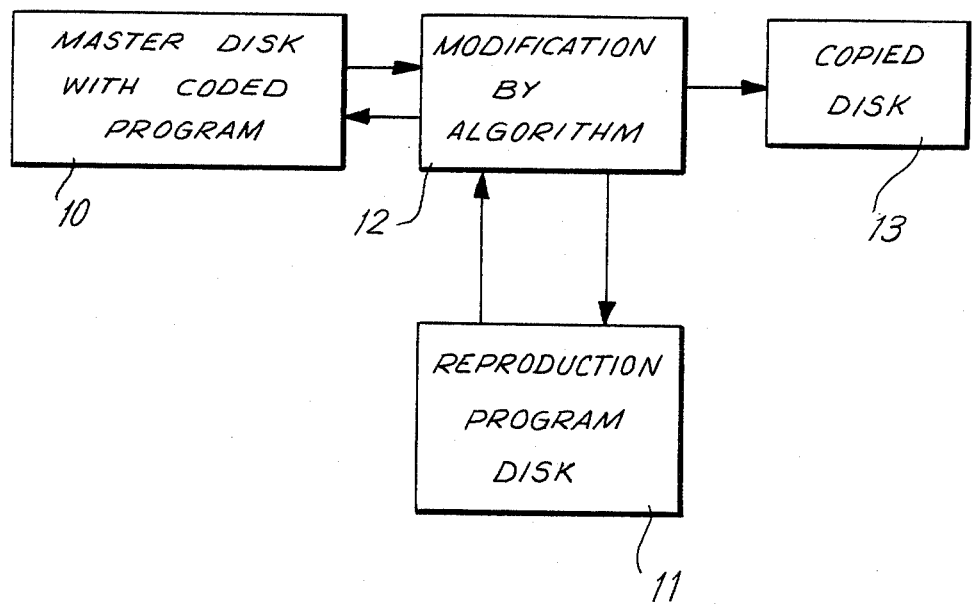
FIG. 1 is a simplified block diagram of one embodiment of the method in accordance with the invention.

Referring now to the drawings, FIG. 1 illustrates one method that may be employed in accordance with the invention for reproducing programs. In accordance with the invention the master disk 10 or other mass storage device is provided with a program for operation on a given type of microcomputer or other data processing device. The program on the master disk, however, is designed so that it will not function correctly if the disk were to be directly employed in the microcomputer. The program may, for example, have missing portions, jumbled portions, excess portions, improper references to memory for the given microcomputer, or improper data for such microcomputer.

In accordance with the present invention, a reproduction program disk 11 is also provided, having thereon a program including an algorithm for correcting the erroneous or missing information programmed onto the master disk. The program of the reproduction disk is thus employed to modify the program output from the master disk, as indicated at 12, to record the copy disk 13 with the modified master disk program, such that the program recorded on the copy 13 is complete and operable.

As an example, the reproduction program disk may be provided with a program for sequentially inputting and storing sectors or tracks of the master disk, review and modify the stored data if necessary, and read out the corrected or modified data to the tracks of the copy disk.

In addition to modification of the master disk program or recording on the copy disk 13, the program of the reproduction program disk 11 preferrably modifies determined stored data in the reproduction program disk itself, in order to maintain a record of the number of usages of the reproduction program disk and hence to maintain a record of the number of reproductions made of the master disk program. For example, a storage location on the reproduction program disk 11 may be assigned an accounting function, the program of the reproduction program disk incrementing the data stored at such location upon every execution of the program. If desired, the accounting information stored at such location may be in coded form, with modification of such data being effective by means of an algorithm in the program of the reproduction program disk. The program of the reproduction program disk may hence read out the data at the accounting memory location, modify it and then restore it at the assigned location of the reproduction program disk.

This feature thereby enables the owner of the program on the master disk to periodically read out the accounting data on the reproduction program disk of each licensee, in order to enable billing of such licensee for the actual number of reproductions of the program that have been made.

In a further modification, it is apparent that the reproduction program disk 11 may have a plurality of assigned locations for different master programs, thereby enabling a record to be made on the reproduction program disk of the number of times that each of the master disk programs have been reproduced. For this purpose, the program of the reproduction program disk interrogates data stored on the master program disk, in order to identify the program that is being copied. With this information, the program of the reproduction program may be directed to the corresponding accounting data of the reproduction program disk, thereby to update this specific data in the described manner. The owner of the programs of the master disk may hence be advised of the number of times of usages of each of the programs of separate master disks that have been reproduced so that proper billing may be made at the rates assigned the different master disk programs.

In a further feature of the invention, in addition to, or as an alternative to, restoring the accounting data on the reproduction program disk, the program of the reproduction program disk may store the updated accounting data on the master disk, at an assigned location. This feature enables the owner of the program to obtain the necessary accounting information from the respective master disk, in the event of destruction or loss of the reproduction program disk assigned to a licensed retailer. This feature inhibits defeat of the accounting of usage of the master disk merely by reproduction of the program disk to maintain duplicate records, i.e., one for reproduction of the master disk programs and the other for accounting to the program owner. In this latter accounting technique, the updating of the accounting data on the master disk may, if desired, be effected in accordance with the accounting data previously stored on the master disk, rather than in accordance with the data stored on the reproduction program disk, thereby enabling a separate independent accounting of data on the master disk. Differences in accounting on the two disks provide the owner with evidence of illegal copying by the licensee.

Figure 2:
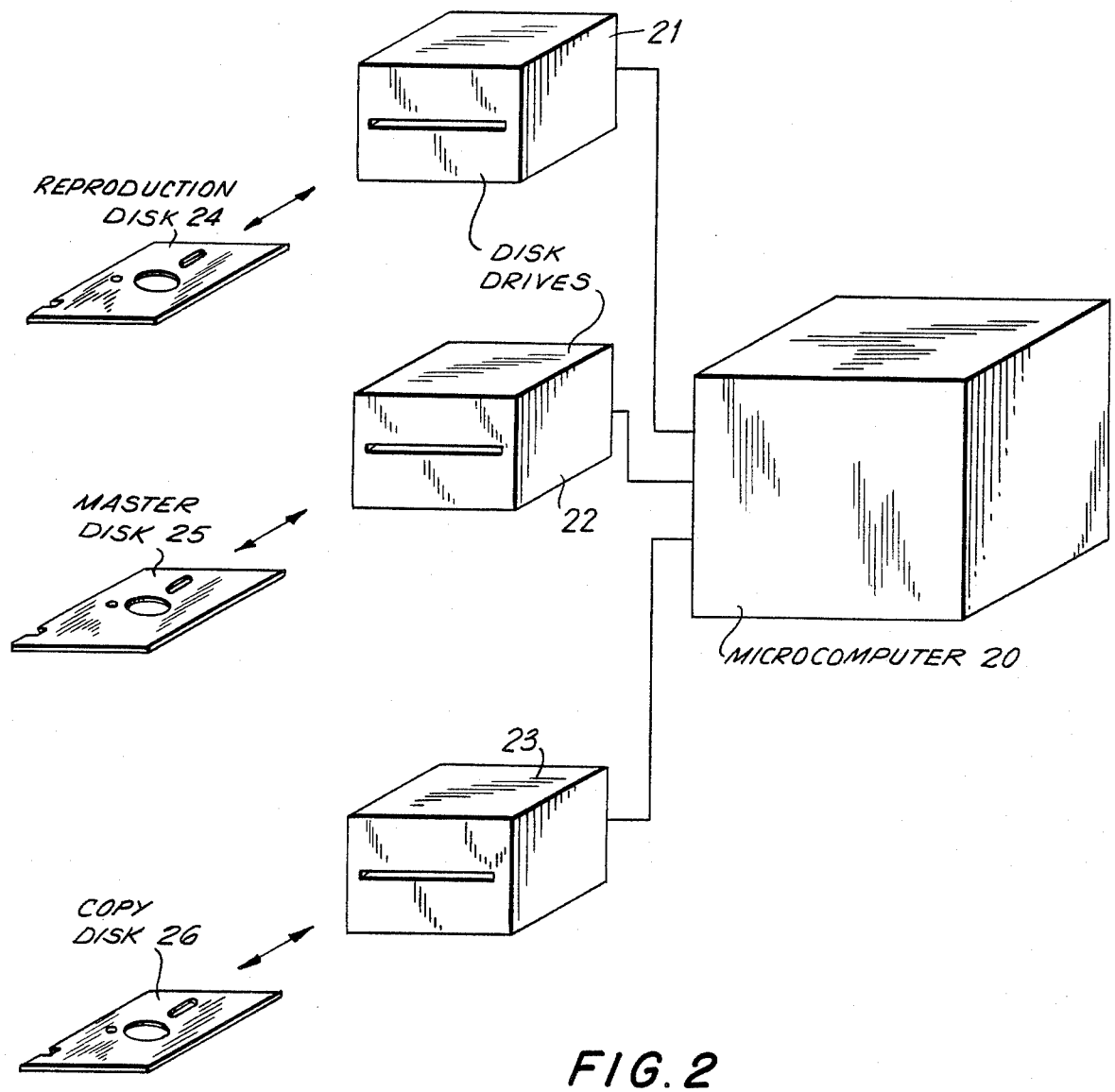
FIG. 2 is a simplified illustration of one embodiment of apparatus that may be employed for reproducing a program, in accordance with the invention.
Figure 3:
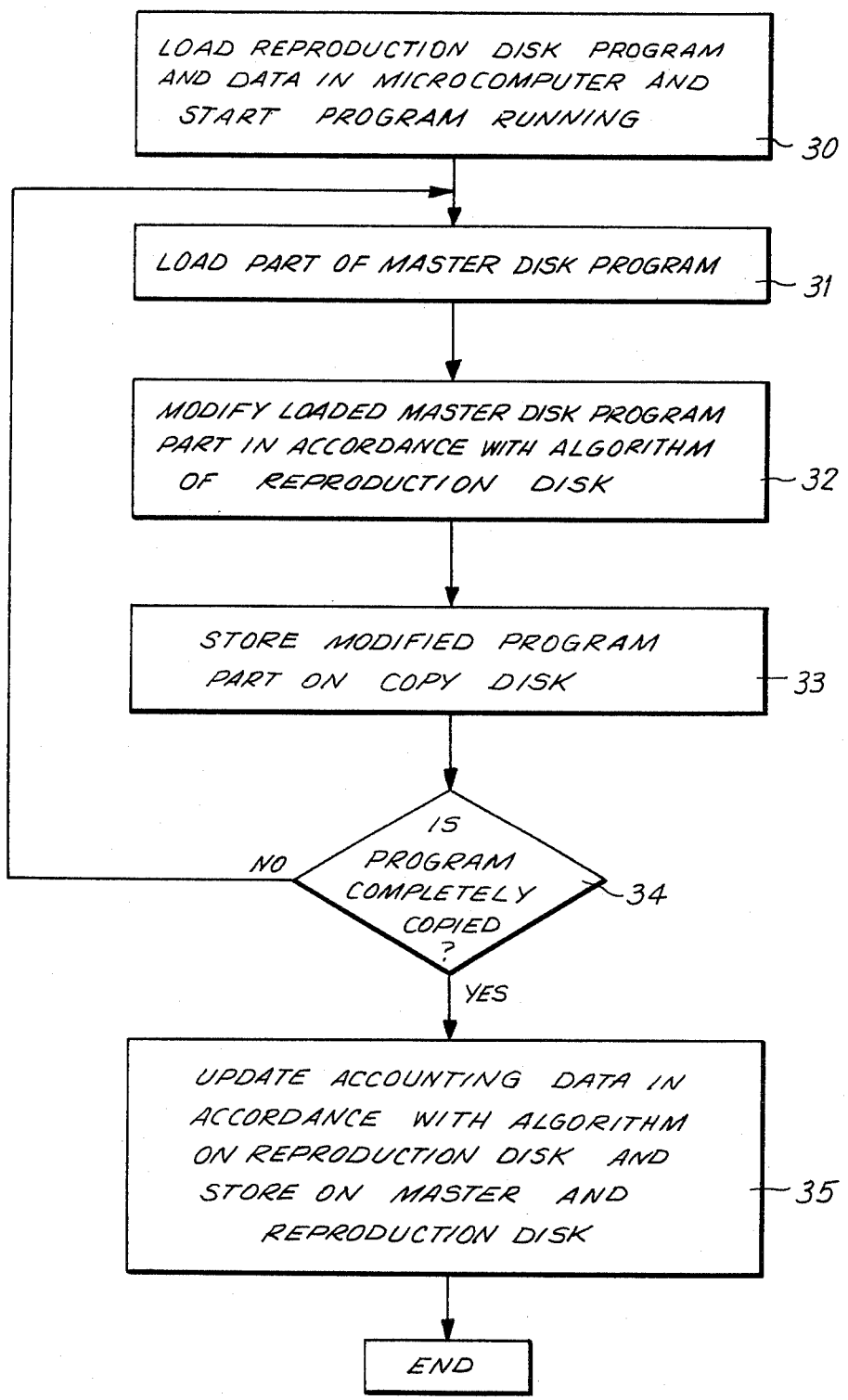
FIG. 3 is a flow diagram of a method for reproducing programs in accordance with the invention.

One embodiment of an apparatus may be employed in accordance with the invention is illustrated in FIG. 2, wherein a conventional microcomputer 20 is provided with 3 disk drives, 21, 22, and 23. A reproduction program disk 24 is adapted to be inserted in the disk drive 21, and a master program disk 25 is adapted to be inserted in the disk drive 22. The copy disk 26, upon which the corrected master disk program is to be copied, is adapted for insertion in the disk drive 23. A sequence of operations for effecting the copying of corrected master program on a copy disk is illustrated in FIG. 3. In this sequence, the program of the reproduction program disk 24 is first loaded in the microcomputer, along with any accounting data stored therein, as indicated at block 30. The disk operating system of the microcomputer may be designed to immediately start the loaded reproduction program.

The program of the reproduction program disk may initially load a first part of the program of the master disk into a determined storage area of the microcomputer as illustrated at block 31. This master program part now stored in the microcomptuer is then modified in accordance with a determined algorithm from the reproduction program disk, as illustrated at block 32. Such modification may of course be of any of a number of forms. It may comprise the insertion of determined data at determined memory storage locations, or deletion of determined data, or it may comprise the actual modification of memory at determined locations in accordance with an algorithm in the reproduction program. In a further technique, the reproduction program may search the master disk program part for determined data, and then modify such found data, to generate data related thereto in accordance with an algorithm in the reproduction program. It is of course apparent that these are only examples of techniques that may be employed to modify the master disk program to make it operative, and that other techniques may be employed alternatively or in combination with the above techniques.

Following such modification of the master program part, this modified portion of the program is now copied to the copy disk, as illustrated at block 33. A determination is then made as to whether or not the full master program has been copied, at block 34. This may be effected by any known technique, for example by coding the last track of the master disk to be copied in a determined manner. If the full master program has not been copied the program branches back to retrieve and process the next part of the master program.

Following a successful copying of the master disk program on the copy disk, the accounting data is brought up to date in block 35. For this purpose, the stored accounting data from the reproduction program disk may be incremented or otherwise modified in accordance with a given algorithm, for restoring on the reproduction program disk and, if desired, also on the master program disk. As discussed above, such updating of accounting data may also comprise separate updating of accounting data on the master disk by recovering data already on such master disk, modifying it, and restoring the updated data directly on the master disk. It is alternatively possible to accomplish the same effect with two disk drives instead of three by removing the copy program disk and inserting the blank disk at the appropriate point. The program can easily be adapted to indicate to the operator when to make the disk change.

The determination of the number of times a master program has been copied thus requires reading out of the determined accounting data locations of the reproduction program disk or the master program disk. In order to simplify such accounting, the licensee may thus periodically mail the reproduction program disk or master disk, to the program owner, for example upon receipt of a new disk.

When employing the method and program disks in accordance with the invention, it is apparent that a retailer selling programs need only stock one copy of each master program for each hardware type of concern, and one or several reproduction copy disks, along with blank disks suitable for receiving any program. The invention thereby substantially minimizes the inventory that must be carried by a retailer, while ensuring the proper accounting of programs that are sold.

While the invention has been disclosed and described with reference to a limited number of embodiments, it will be apparent that variations and modifications may be made therein, and it is therefore intended in the following claims to cover each such variation and modification as falls within the true spirit and scope of the invention.

I claim:

1. In a method for producing a first coded program on a first medium from a second coded program on a second medium by means of a programmable reading and writing device, the improvement comprising providing a second program on said second medium that is at least partially inoperable, controlling said programmable reading and writing device with a coded third program on a third medium to copy said second coded program onto said first medium at least in part in accordance with an algorithm contained in said third program, to thereby render said first program operable, and, during said step of controlling, modifying determined data in said third coded program on said third medium to record the number of occurences of said controlling step.

2. The method of claim 1 wherein said step of controlling comprises modifying at least a portion of the second coded program for producing said first coded program.

3. A method of claim 1 wherein said step of controlling comprises adding information to said second coded program for producing said first coded program.

4. The method of claim 1 wherein said step of controlling comprises deleting a portion of said second coded program for producing said coded program.

5. The method of claim 1 wherein said step of modifying determined data in said third coded program comprises incrementing said determined data.

6. A method of claim 1 wherein said step of modifying determined data in said third coded program comprises modifying said determined data in accordance with a given algorithm.

7. The method of claim 1 further comprises modifying determined data in said second coded program on said second medium in order to record therein the number of occurrences of said controlling step.

8. A method of recording a program on a first magnetic medium, comprising recording an at least partially inoperable program on a second magnetic medium, recording a reproducing program on a third magnetic medium, said reproducing program comprising at least one algorithm for correcting the inoperability of the program on said second magnetic medium, correcting the program on said second magnetic medium in accordance with said algorithm and recording the corrected program on said first magnetic medium, and modifying determined data on at least one of said second and third magnetic media for indicating the number of times the program on said second magnetic medium has been modified for recording on a first magnetic medium.

9. The method of claim 8 wherein said step of modifying data on at least one of said second and third magnetic media comprises incrementing determined data on said third magnetic media.

10. The method of claim 8 wherein said step of modifying determined data on one of said second and third magnetic media comprises modifying data on said third magnetic medium in accordance with a given algorithm.

11. The method of claim 8 wherein said step of modifying determined data on one of said second and third magnetic media comprises incrementing data on said second magnetic media.

12. The method of claim 8 wherein said step of modifying determined data on one of said second and third magnetic media comprises modifying said determined data on said second magnetic medium in accordance with a given algorithm in a program on said third magnetic media.

13. A set of magnetic media having programs stored thereon, for recording a program on a third magnetic medium, said set comprising a first magnetic media having stored thereon a program that is at least partially inoperable and a second magnetic medium having stored thereon a program including an algorithm for correcting the inoperability of said first magnetic medium.

14. The set of magnetic media of claim 13 wherein said second magnetic medium has determined data stored therein, and the program on said second magnetic medium includes steps for modifying said determined data in accordance with a given algorithm upon each operation of the program.

15. The set of magnetic media of claim 13 wherein said first magnetic medium has determined data stored thereon, and said program on said second magnetic medium includes steps for modifying said determined data on said first magnetic medium in accordance with a given algorithm, on each operation of the program on said second magnetic medium.

16. The set of magnetic media of claim 13 wherein the program on said first magnetic medium is incomplete by virtue of having information missing therefrom.

17. The set of magnetic media of claim 13 wherein said program on said first magnetic medium is inoperable by virtue of having excess information therein.

18. The set of magnetic media of claim 13 wherein the program on said first magnetic medium is inoperable by reason of having incorrect information thereon for the running of the respective program.

19. The set of magnetic media of claim 13 wherein said first and second magnetic media are floppy disks.

* * * * *